July 28, 1970      J. ROTH      3,521,948
EXPOSURE CONTROL FOR PHOTOGRAPHIC CAMERAS Filed Jan. 11, 1968      2 Sheets-Sheet 1

Inventor
Johann Roth
By Michael S. Striker
Attorney

United States Patent Office 3,521,948
Patented July 28, 1970

3,521,948
EXPOSURE CONTROL FOR PHOTOGRAPHIC CAMERAS
Johann Roth, Schwabhausen, Germany, assignor to Niezoldi & Kramer G.m.b.H., Munich, Germany
Filed Jan. 11, 1968, Ser. No. 697,182
Claims priority, application Germany, Jan. 12, 1967, N 29,817
Int. Cl. G01j 1/44; G03b 7/00
U.S. Cl. 352—141                          16 Claims

ABSTRACT OF THE DISCLOSURE

Exposure control for photographic cameras wherein the needle of an exposure meter adjusts the diaphragm. The exposure meter is connected in series with a light-sensitive resistor and the latter can be connected in parallel with a variable resistor which is normally open but can be manipulated by hand and/or by a motor. A fixed or variable shunt resistor can be connected in parallel with the exposure meter when the scene light is full of contrasts so as to cause the diaphragm to define a larger aperture.

BACKGROUND OF THE INVENTION

The present invention relates to photographic cameras in general, and more particularly to improvements in exposure controls for cameras, especially for use in motion picture cameras. Still more particularly, the invention relates to improvements in automatic exposure controls of the type wherein a moving coil instrument or an analogous exposure meter is connected in series with a light-sensitive receiver which is exposed to scene light so that the position of the output member of the moving coil instrument is a function of scene brightness. The output member can adjust the shutter and/or the diaphragm to insure that the exposure time and/or the aperture size is determined as a function of scene brightness.

It is already known to couple the diaphragm with the output member of a moving coil instrument in an automatic exposure meter so that the aperture size varies as a function of changes in scene brightness. It is also known to provide such exposure controls with a first variable resistor which is placed in series with a light-sensitive resistor and can be adjusted in a sense to increase the aperture size, and with a second variable resistor in parallel with the light-sensitive resistor. The second variable resistor can be adjusted to reduce the aperture size by offering to the flow of current through the moving coil instrument a resistance which is less than that of the light-sensitive resistor. One of these variable resistors is connected into the circuit when the other variable resistor is disconnected, or vice versa. By manipulating the second variable resistor, the operator of the camera is in a position to reduce the aperture size below that which is selected automatically by the exposure control within a range of normal scene brightnesses and within limits determined by the type of film.

However, it happens frequently that an operator wishes to make an exposure when the scene light is full of contrasts, for example, to take a picture of a person or object in a snowy landscape, on the seashore, on a mountain, or against the sun. It is then necessary to correct the automatically selected exposure values because such values are determined as a function of the intensity of light reflected by the subject or object and by the background. Such corrections can be made by manipulation of the aforementioned first variable resistor which is in series with the light-sensitive resistor. However, and since the two variable resistors cannot be manipulated simultaneously (they are controlled by a common actuating member which disconnects one of the resistors when the other is connected in to the circuit, and vice versa), such cameras cannot make satisfactory exposures when the scene light is full of contrasts. The actuating member is movable from a zero position in which it disconnects both variable resistors in a first direction to connect the first resistor (reduction of aperture size) and in a second direction to connect the second resistor (increasing aperture size). Such cameras will operate properly only when the scene light is substantially free of contrasts.

SUMMARY OF THE INVENTION

It is an object of my invention to provide an exposure control, particularly for use in motion picture cameras, which enables the user to make satisfactory exposures when the scene light is substantially free of contrasts as well as when the contrasts in scene brightness are very pronounced.

Another object of the invention is to provide an exposure control which is equipped with overriding means enabling the user to modify the automatically determined exposure values within a very wide range.

A further object of the invention is to provide an exposure control which renders it possible to repeatedly expose selected portions of film to produce special effects, such as fade-in and fade-out.

An additional object of the invention is to provide a camera which embodies the above outlined exposure control and which is capable of indicating to the user when the automatically selected exposure values are altered as well as the extent of such alterations.

The improved exposure control is particularly suited for use in or with a motion picture camera and comprises an exposure meter (e.g., a moving coil instrument) having a turnable or otherwise movable output member which can determine the setting of the shutter and/or diaphragm in a camera, a light-sensitive receiver exposed to scene light and normally connected in circuit with the exposure meter to determine the position of the output member as a function of scene brightness, and overriding means including a variable resistor connectable in parallel with the light-sensitive receiver to influence the position of the output member, a fixed or variable shunt resistor, and control means for connecting the shunt resistor in parallel with the exposure meter. The control means may include a switch which is preferably installed at a point close to the shutter release and may be coupled with an indicator observable in the viewfinder of the camera. The arrangement is preferably such that the variable resistor is normally open and can be closed by hand and/or by means of a motor to gradually reduce its resistance to the flow of electric current in response to movement from a starting or normal position.

The novel features which are considered as characteristic of the invention are set forth in particular in the appended claims. The improved exposure control itself, however, both as to its construction and its mode of opertion, together with additional features and advantages thereof, will be best understood upon perusal of the following detailed description of certain specific embodiments with reference to the accompanying drawing.

DESCRIPTION OF THE PREFERRED EMBODIMENTS

Figure 1:
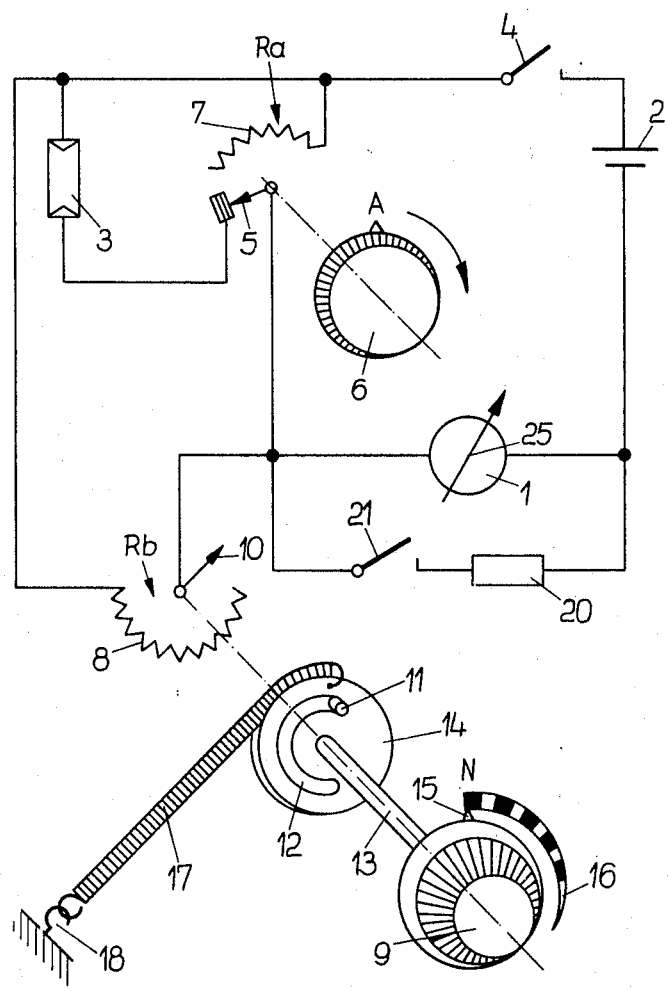
FIG. 1 is a diagrammatic view of an exposure control which embodies one form of my invention.

FIG. 1 illustrates an exposure control for a motion picture camera. This exposure control comprises an exposure meter here shown as a moving-coil instrument 1 having an output member or needle 25 which is movable between several positions as a function of changes in scene brightness and can serve to effect changes in the size of a diaphragm aperture. The manner in which a diaphragm can be adjusted in response to changes in the position of the needle 25 is well known from the art of cameras and, therefore, the diaphragm is not shown in the drawing. It is clear that the needle 25 can be used to change the setting of a shutter so as to select the exposure time as a function of changes in scene brightness and/or that the needle 25 can influence the setting of the diaphragm and the setting of the shutter. The exposure control further includes a battery 2 or an analogous source of electrical energy in series with the moving coil instrument 1, with a master switch 4 and with a light-sensitive receiver, here shown as a resistor 3. When the master switch 4 is closed (for example, in response to actuation of the shutter release trigger), the position of the needle 25 is a function of scene brightness because the light-sensitive resistor 3 is exposed to scene light.

A conventional first variable resistor $Ra$ including a wire 7 and a slider 5 can be connected in the circuit as a substitute for the resistor 3, i.e., in series with the battery 2 and moving coil instrument 1. A knob 6 or an analogous actuating member can be turned by hand to leave the idle position A and to thus connect the variable resistor $Ra$ in the electric circuit. By moving away from the position A, the knob 6 first opens the circuit and thereupon connects the resistor $Ra$ instead of the light-sensitive resistor 3. The resistance of the resistor $Ra$ decreases in response to rotation of the knob 6 in the direction indicated by arrow. Thus, by manipulating the knob 6, the user can select the aperture size at will.

A second variable resistor or overriding means $Rb$ including a wire 8 and a slider 10 is controlled by a second actuating member or knob 9. When the resistance of the resistor $Rb$ is being changed, the knob 6 remains in the starting position A. The starting or normal position of the knob 9 is shown at N. The slider 10 of the second variable resistor $Rb$ is connected with a shaft 13 which is rotatable by the knob 9. This shaft 13 carries a disk 14 having an arcuate groove 12 for a fixed pin 11, and the disk 14 is biased in a counterclockwise direction by a prestressed helical spring 17 one end of which is attached to a stationary retainer 18. When the disk 14 assumes the angular position shown in FIG. 1, i.e., when the knob 9 stays in the normal position N, the resistor $Rb$ is disconnected but this resistor is connected in parallel with the light sensitive resistor 3 when the knob 9 is turned by hand to rotate the shaft 13 and the disk 14 against the opposition of spring 17. The resistance of the resistor $Rb$ decreases continuously while the knob 9 rotates toward an end position determined by the length of the slot 12. An index 15 on the knob 9 cooperates with a scale 16 which is calibrated to indicate different positions of the slider 10. When released, the knob 9 is automatically returned to the position N by spring 17 which stores additional energy while the disk 14 turns in a clockwise direction.

When the scene light is full of contrasts (for example, when the user desires to take the picture of a person or a group of persons with a background of snow), closing of a control switch 21 connects a fixed shunt resistor 20 in parallel with the moving coil instrument 1. The resistor 20 serves to correct the exposure values determined by the instrument 1. The switch 21 is preferably closed by a pushbutton which is placed close to the shutter release. The knob 9 can be adjusted when the control switch 21 is open or closed. The resistor 20 influences the exposure value in a sense to cause overexposure when the scene light is full of contrasts, i.e., to reduce the current flow through the moving coil instrument 1 and to thus influence the needle 25 in the same way as when the intensity of scene light decreases so that the diaphragm defines a larger aperture.

When the variable resistor $Rb$ is connected in parallel with the light-sensitive resistor 3 and is moved away from its normal position N, the total resistance offered by resistor 3 and resistor $Rb$ decreases which causes the needle 25 to move in a sense to reduce the aperture size. The aperture sizes can be read on the scale 16. As stated before, the needle 25 can also influence the exposure time, for example, by bringing about changes in the position of blades in a rotary shutter for motion picture cameras. Such adjustments can be carried out in addition to or instead of adjustments in the aperture size. The aperture size increases and/or the exposure time is longer when the knob 9 is released because the resistor $Rb$ then opens automatically. The camera is ready to make exposures with fully automatic selection of exposure values by the light-sensitive resistor 3 when the resistor $Rb$ is disconnected from the circuit.

The slider 5 of the variable resistor $Rb$ can be rotated by power-operated means to insure gradual and uniform changes in the aperture size during a series of successive exposures. The power-operated means may include a motor which is connected with the film transporting mechanism of a camera in such a way that, during a first exposure of a film portion which is to be exposed twice in a row, the resistance of the resistor $Rb$ decreases to effect a reduction in the aperture size and that, during the next-following exposure of the same film portion, the resistance of the resistor $Rb$ increases to effect an increase in the aperture size. The film transporting mechanism is then constructed in such a way that a certain length of motion picture film can be transported backwards.

Figure 2:
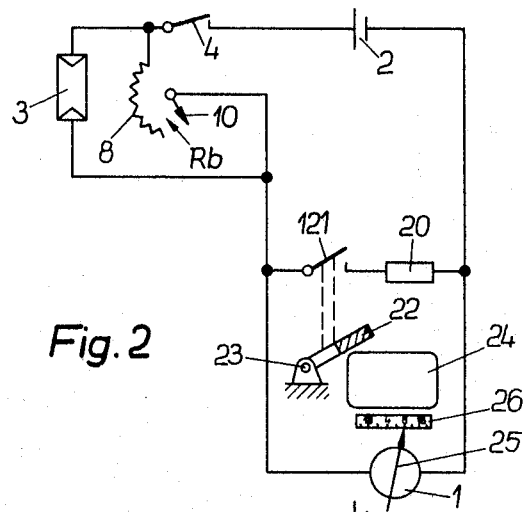
FIG. 2 is a fragmentary diagrammatic view of a second exposure control.

In the embodiment of FIG. 2, the shunt resistor 20 can be connected into the electric circuit by means of a control switch 121 which is coupled with an indicator 22. The latter can turn on a pivot pin 23 and moves into registry with the viewfinder 24 when the switch 121 is closed. This informs the user of the camera that the switch 121 is closed. The needle 25 of the moving coil instrument 1 is movable along a graduated scale 26 which is observable by looking through the viewfinder 24. The scale 26 is calibrated to indicate various aperture sizes. The variable resistor $Rb$ is shown in open position. The control switch 121 can be opened or closed by turning the pivot pin 23 or by depressing a pushbutton which is preferably installed in close proximity of the shutter release.

Figure 3:
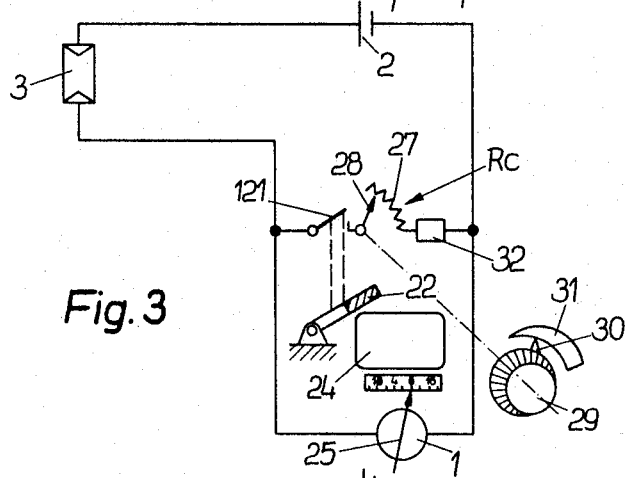
FIG. 3 is a fragmentary diagrammatic view of a third exposure control.

Referring to FIG. 3, the shunt resistor 20 of FIG. 1 or 2 is replaced by a variable shunt resistor $Rc$ which is adjustable by a knob 29 so that its resistance decreases when the knob is moved from its normal position. The slider 28 of the resistor $Rc$ is turnable with reference to the wire 27 in response to rotation of the knob 29. The index 30 of the knob 29 is movable into registry with graduations on a fixed scale 31 to indicate various resistance values.

The variable resistor $Rc$ is placed in series with a fixed resistor 32 which prevents short-circuiting of the moving-coil instrument 1. The control switch 121 is coupled with an indicator 22 which moves into registry with the viewfinder 24 when the switch 121 is closed.

The variable resistor $Rb$ is not shown in FIG. 3. This variable resistor is installed in parallel with the light-sensitive resistor 3 in the same way as shown in FIG. 1 or 2.

Figure 4:
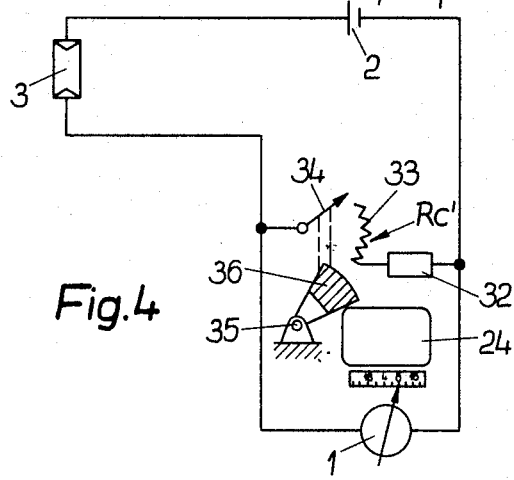
FIG. 4 is a fragmentary diagrammatic view of a fourth exposure control.

FIG. 4 shows a variable shunt resistor $Rc'$ having a wire 33 and a turnable slider 34. The resistance of the resistor $Rc'$ decreases in response to clockwise rotation of the slider 34, and the latter is coupled with a segmentshaped indicator 36 which is turnable about a pivot pin 35. The indicator 36 can be seen in the viewfinder 24. The extent to which the indicator 36 registers with the viewfinder 24 indicates the resistance of the resistor Rc', i.e., the extent of correction of the exposure. The fixed resistor 32 which is in series with the shunt resistor Rc' prevents short-circuiting of the moving coil instrument 1. The variable resistor Rb is ot shown in FIG. 4.

The means for turning the indicator 36 or slider 34 preferably comprises a pushbutton (not shown) placed close to the shutter release trigger. Detent means may be provided to enable the operator to "feel" various positions of the push-button and a spring can return the pushbutton to normal position in response to termination of finger pressure.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a photographic camera, particularly in a motion picture camera, an exposure control comprising an exposure meter having a movable exposure adjusting output member; a light-sensitive receiver exposed to scene light and normally connected in circuit with said exposure meter to determine the position of said output member as a function of scene brightness; a shunt resistor; control means for connecting said shunt resistor in parallel with said exposure meter; and a variable resistor connectable in parallel with said light-sensitive receiver to influence the position of said output member, the resistance of said variable resistor being variable independently of said control means.

2. A combination as defined in claim 1, wherein said light-sensitive receiver is a resistor, and further comprising a source of electrical energy in series with said receiver and said exposure meter.

3. An exposure control as defined in claim 1, further comprising actuating means for connecting said variable resistor in parallel with said receiver independently of said control means and for varying the resistance of said variable resistor.

4. A combination as defined in claim 1, wherein said control means includes a switch which is adjacent to the shutter release of the camera.

5. A combination as defined in claim 1, wherein said output member is arranged to adjust the diaphragm.

6. A combination as defined in claim 1, wherein said output member is arranged to adjust the exposure time.

7. A combination as defined in claim 1, further comprising actuating means for connecting said variable resistor in parallel with said receiver and for varying the resistance of said variable resistor.

8. A combination as defined in claim 7, wherein said actuating means comprises an actuating member movable from a starting position in which said variable resistor is disconnected from said receiver to an end position to thereby decrease the resistance of said variable resistor, and biasing means for urging said actuating member to starting position.

9. A combination as defined in claim 8, wherein said actuating member is a rotary knob which is turnable by hand.

10. A combination as defined in claim 1, wherein said control means comprises a switch in series with said shunt resistor and movable between open and closed positions.

11. A combination as defined in claim 10, further comprising a viewfinder and means for indicating the position of said switch to a person looking through said viewfinder.

12. A combination as defined in claim 11, wherein said indicating means comprises an indicator which is coupled with said switch and registers with said viewfinder in the closed position of said switch.

13. A combination as defined in claim 1, wherein said shunt resistor is a variable resistor.

14. A combination as defined in claim 13, wherein said shunt resistor comprises a first portion and a second portion movable by said control means into engagement with and along said first portion to thereby change the resistance of said shunt resistor.

15. A combination as defined in claim 14, further comprising a viewfinder and indicating means coupled with said second portion and arranged to indicate the position of said second portion to a person looking through said viewfinder.

16. A combination as defined in claim 14, further comprising a fixed resistor in series with said shunt resistor.

References Cited

UNITED STATES PATENTS

| | | | |
|---|---|---|---|
| 2,061,909 | 11/1936 | Karg | 95—64 |
| 2,261,532 | 11/1941 | Tonnies | 352—141 |
| 2,323,739 | 7/1943 | Wagner. | |
| 2,351,978 | 6/1944 | Kuppenbender. | |
| 3,220,326 | 11/1965 | Scudder. | |
| 3,298,773 | 1/1967 | Auracher | 352—141 |
| 3,364,306 | 1/1968 | Brown | 352—91 XR |

FOREIGN PATENTS 870,566    3/1942    France.

NORTON ANSHER, Primary Examiner

J. F. PETERS, Jr., Assistant Examiner

U.S. Cl. X.R.

95—10, 64; 352—91; 356—226